A. LEYER.
AURIPHONE.
APPLICATION FILED OCT. 6, 1914.
1,173,286.  Patented Feb. 29, 1916.
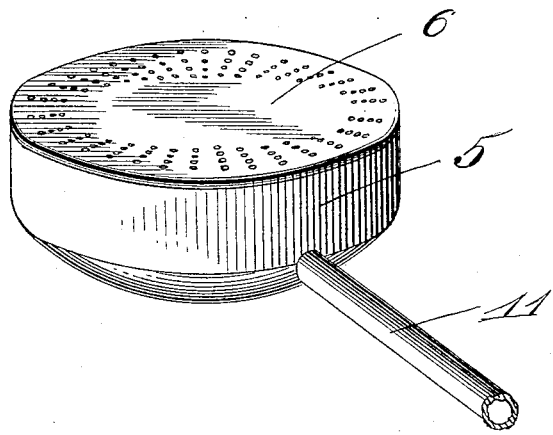
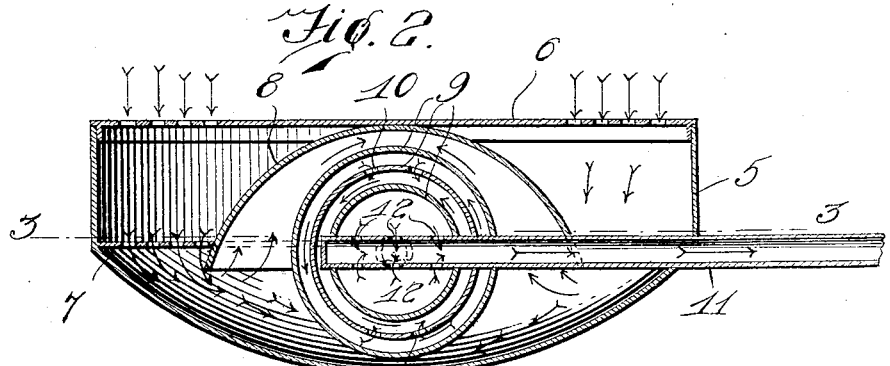
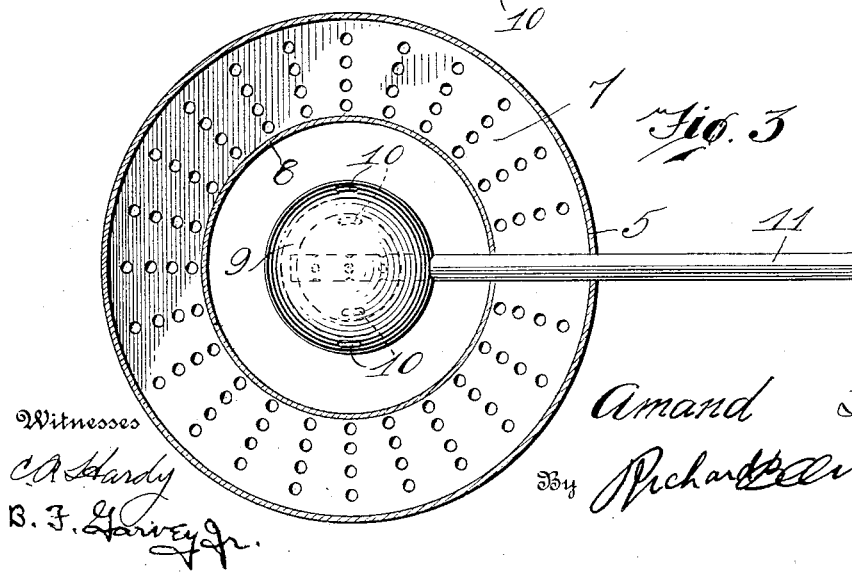
Witnesses
C. A. Hardy
B. F. Harvey Jr.
Inventor
Amand Leyer
By Richard B. Owen.
Attorney

UNITED STATES PATENT OFFICE.

AMAND LEYER, OF DUTCH FLAT, CALIFORNIA.

AURIPHONE.

1,173,286.  Specification of Letters Patent.  Patented Feb. 29, 1916.

Application filed October 6, 1914. Serial No. 865,333.

*To all whom it may concern:*

Be it known that I, AMAND LEYER, a citizen of the United States, residing at Dutch Flat, in the county of Placer and State of California, have invented certain new and useful Improvements in Auriphones, of which the following is a specification.

This invention pertains to improvements in auriphones and analogous aids for hearing, having for its primary object to amplify sound, without materially minimizing its clarity.

A further object is to eliminate the use of artificial tympanums or other fragile instrumentalities, and to provide a durable structure of an incumbersome nature, which is highly efficient for conveying sound to the inner ear.

Other objects as well as the nature, characteristic features, and scope of my invention will be more readily understood from the following description taken in connection with the accompanying drawings and pointed out in the claims forming a part of this specification.

Referring to the drawings: Figure 1 is a perspective view of a device constructed in accordance with my invention, a portion of the tube thereof being broken away, Fig. 2 is a sectional view of the same illustrating to advantage the reverberant spheroids through which the sound passes, and Fig. 3 is a horizontal sectional view illustrating to advantage the interior of the housing, and the spheroids used in this invention.

In the drawings wherein is illustrated the preferred embodiment of this invention, a housing 5 is provided, which in the present instance is of a substantially hemispherical configuration and has detachably mounted therein a perforated cap 6, which has an annular flange depending therefrom the latter snugly engaging the inner periphery of the housing 5, as shown to advantage in Fig. 2. A foraminated disk 7 is arranged in the housing having the central portion thereof cut out and engaged with the outer periphery of a resonant crown 8, the latter being likewise of a hemispherical configuration and has the marginal edge thereof extended slightly below the foraminated disk 7, as likewise shown to advantage in Fig. 2.

Mounted between the inner periphery of the housing 5 and the inner periphery of the resonant crown 8 and in spaced relation thereto, are a plurality of reverberant spheroids, 9, said spheroids varying in configuration and being placed one within the other in spaced relation and provided with openings 10 through which the sound passes, as indicated by the arrow. It is seen that the openings 10 are non-alined so as to require the sound to pass entirely through each one of the ways provided by the plurality of spheroids, before passing therefrom into the next way. The innermost of said spheroids is provided with a pair of diametrically opposite openings through which extends one end of a tube 11, the terminal thereof being closed, while the opposite end in the drawings is broken away, but it is to be understood that the tube is to be placed in engagement with suitable ear engaging members which project into the auditory canals, acoustical impulses which enter through the perforated cap 6 are thereby communicated to the inner ear, since the end of the tube which is housed within the innermost of the spheroids 9, is provided with a plurality of openings 12, thereby permitting the sound to be emitted through said tube after having passed through all of the spheroids. In operation therefore, it is seen that the sound will first pass through the perforated cap 6 after which it takes the course as indicated by the arrows in Fig. 2, through the foraminated disk 7 and subsequently beneath the resonant crown 8 and into the spheroids 9 to the tube 11.

It is, of course, understood that the device is of a relatively small nature, so as to be placed on the person, and carried without inconvenience to the wearer.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention, what I claim as new and desire to secure by Letters Patent is:

1. An auriphone including a housing having a perforated closure, a plurality of reverberant spheroids concentrically mounted in the housing and arranged one within the other, said spheroids being provided with non-alining openings through which the sound passes whereby an evolution of the sound in each spheroid is necessitated to increase its intensity, and a conducting tube extending from one of said spheroids and adapted to engage the auditory canal for conveying sound thereinto.

2. An auriphone including a housing, a perforate cap detachably associated with said housing through which the sound passes to the interior of the latter, a resonant crown mounted in said housing with which the sound contacts subsequent to passing through said perforate cap, a plurality of reverberant spheroids mounted in the housing, said spheroids being of variant sizes and adapted to be placed one within the other, each being provided with openings through which the sound passes, and a conducting tube engaged through the innermost of said spheroids for conveying sound from the housing after having passed through the spheroids.

3. An auriphone including a housing, a perforate cap detachably mounted on said housing, a foraminated disk carried in said housing, a resonant crown mounted on the disk, a plurality of reverberant spheroids arranged one within the other and provided with openings through which the sound passes, said openings being non-alined permitting a complete circulation of sound in each of said spheroids prior to passing therefrom, and a tube engaged through said housing and with the innermost of said spheroids for conveying sound therefrom.

In testimony whereof I affix my signature in presence of two witnesses.

AMAND LEYER.

Witnesses:
Louis Faller,
Mrs. Louis Faller.

Copies of this patent may be obtained for five cents each, by addressing the "Commissioner of Patents, Washington, D. C."